United States Patent
Kalfon et al.

(10) Patent No.: US 8,605,817 B2
(45) Date of Patent: Dec. 10, 2013

(54) MODULATION AND LAYER MAPPING IN PHYSICAL CHANNELS

(75) Inventors: Shai Kalfon, Hod HaSharon (IL); Ido Gazit, Haifa (IL); Eran Goldstein, Raanana (IL)

(73) Assignee: LSI Corporation, Milpitas, CA (US)

( * ) Notice: Subject to any disclaimer, the term of this patent is extended or adjusted under 35 U.S.C. 154(b) by 211 days.

(21) Appl. No.: 13/277,531

(22) Filed: Oct. 20, 2011

(65) Prior Publication Data

US 2013/0102358 A1   Apr. 25, 2013

(51) Int. Cl.
*H04K 1/02* (2006.01)
*H04L 25/03* (2006.01)
*H04L 25/49* (2006.01)

(52) U.S. Cl.
USPC .......................................... 375/296; 375/259

(58) Field of Classification Search
None
See application file for complete search history.

(56) References Cited

U.S. PATENT DOCUMENTS

| | | | | |
|---|---|---|---|---|
| 8,055,291 B2* | 11/2011 | Haartsen et al. | ............... | 455/522 |
| 2005/0250544 A1* | 11/2005 | Grant et al. | ................ | 455/562.1 |
| 2008/0205533 A1* | 8/2008 | Lee et al. | ....................... | 375/260 |
| 2009/0202014 A1* | 8/2009 | Mujtaba et al. | ................ | 375/267 |
| 2010/0103810 A1* | 4/2010 | Kloos et al. | .................... | 370/204 |
| 2010/0234071 A1* | 9/2010 | Shabtay et al. | ............. | 455/562.1 |
| 2010/0317382 A1* | 12/2010 | Lee et al. | ....................... | 455/501 |
| 2011/0150113 A1* | 6/2011 | Oyman et al. | ................. | 375/260 |
| 2012/0219078 A1* | 8/2012 | Khojastepour et al. | ........ | 375/260 |

* cited by examiner

*Primary Examiner* — Jean B Corrielus

(57) ABSTRACT

Described embodiments provide a wireless communication system that employs modulation and precoding. An input bit stream is divided into one or more batches. Each batch has a consecutive number of bits. A modulation scheme is determined for batches. A precoding scheme for layer mapping is determined for the batches. Based on the modulation scheme and precoding scheme, a look-up table (LUT) is selected. The selected LUT maps the batches into one or more modulated and precoded layers. The modulated and precoded batches are provided to a transmission module.

17 Claims, 2 Drawing Sheets

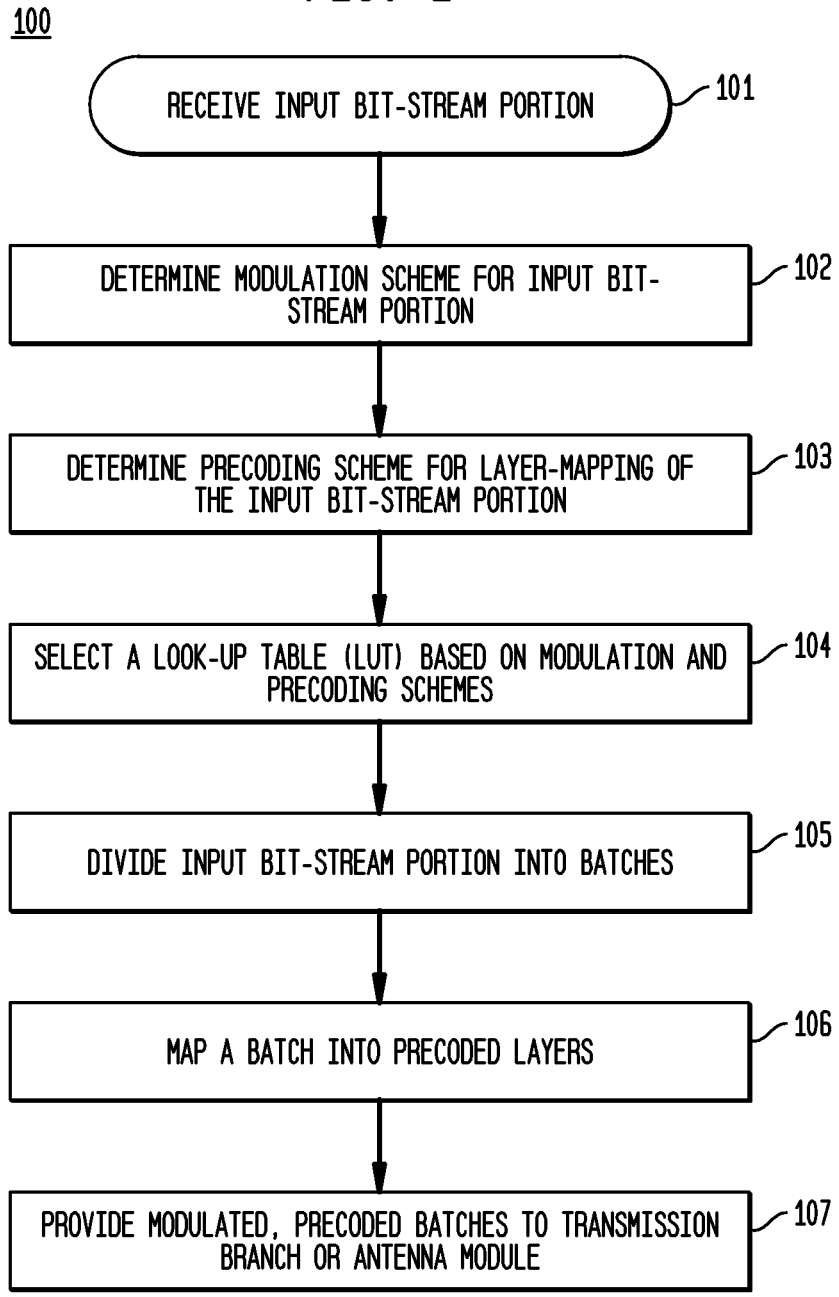

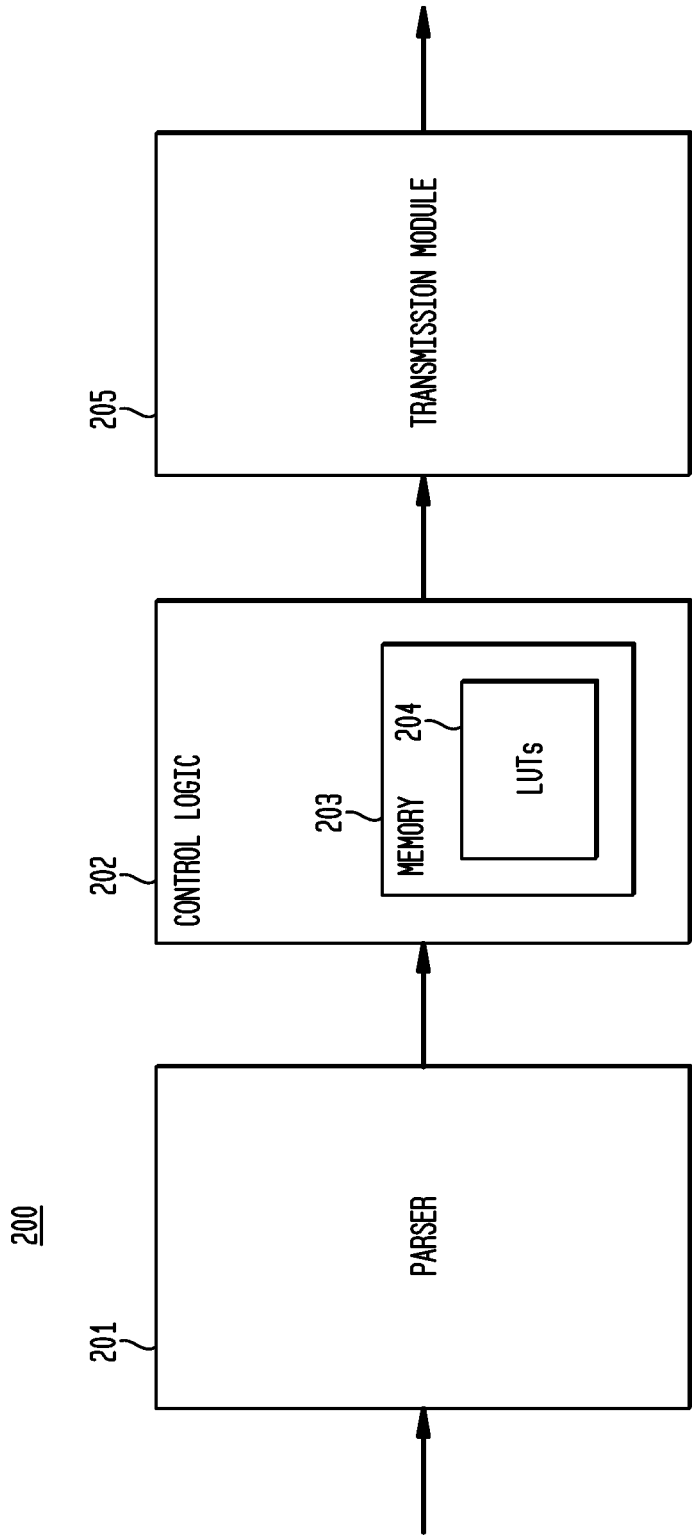

MODULATION AND LAYER MAPPING IN PHYSICAL CHANNELS

BACKGROUND OF THE INVENTION

1. Field of the Invention

The present invention relates to communication systems, in particular, modulating physical channels in Evolved Universal Terrestrial Access (E-UTRA) systems.

2. Description of the Related Art

Mobile stations, such as cellular handsets, rely on radio access technologies to communicate with a core network. A core network is the central part of a telecommunications network, providing services to connected customers. Evolved Universal Terrestrial Access (E-UTRA) is an International Telecommunications radio access network standard optimizing the transfer of packet data. E-UTRA is found in communications such as 4G mobile telecommunications networks. E-UTRA has been developed into a complete set of specifications. Specifically, details on E-UTRA physical channels and modulation are described in "3rd Generation Partnership Project (3GPP); Technical Specification Group Radio Access Network; E-UTRA; Physical Channels and Modulation (3GPP TS 36.211)", hereinafter referred to as "3GPP TS 36.211". 3GPP TS 36.211 defines modulation schemes with a layer mapping algorithm for physical channels.

In general, a channel refers to a communications link connecting two network nodes (e.g., a base station and a cellular handset). The physical channel refers to the means for transmitting and receiving raw bits across a network. A physical channel might group a bit stream into code words or symbols and convert the bit stream into a physical signal that is transmitted over a hardware transmission medium. A property of a physical channel is its modulation scheme, used to convey a message signal inside a carrier signal that can be physically transmitted. 3GPP TS 36.211 describes modulation schemes that first receives binary digits as input and produces complex-valued modulation symbols as output. The symbols are mapped onto one or more transmission layers where a gain and/or an order permutation might be applied. After the mapping, the complex-valued modulation symbols on each layer are precoded for transmission on the antenna ports.

According to the 3GPP TS 36.211, the multi-layer mapping and the precoding processes start after the modulation of bits is complete, thus the multi-layer mapping and precoding processes are performed as distinct processes in the standard. Implementing the modulation schemes using distinct processes as described in the specification documents results in increased processing times. Increased processing times might result in unacceptable system latency and bit rate values.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a wireless communication system that employs modulation and precoding. An input bit stream is divided into one or more batches. Each batch has a consecutive number of bits. A modulation scheme is determined for batches. A precoding scheme for layer mapping is determined for the batches. Based on the modulation scheme and precoding scheme, a look-up table (LUT) is selected. The selected LUT maps the batches into one or more modulated and precoded layers. The modulated and precoded batches are provided to a transmission module.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 1 shows an exemplary method for modulating bits with layer mapping in accordance with a 3GPP standard operating in accordance with exemplary embodiments of the present invention; and FIG. 2 shows a block diagram of an exemplary modulation and precoding system that might implement the method of FIG. 1.

DETAILED DESCRIPTION

In accordance with embodiments of the present invention, a wireless communication system employs modulation and precoding. An input bit stream is divided into one or more batches. Each batch has a consecutive number of bits. A modulation scheme is determined for batches. A precoding scheme for layer mapping is determined for the batches. Based on the modulation scheme and precoding scheme, a look-up table (LUT) is selected. The selected LUT maps the batches into one or more modulated and precoded layers. The modulated and precoded batches are provided to a transmission module.

Embodiments of the present invention might provide for the following advantages. A look-up table based system might encode data for transmission faster, especially if implemented in hardware. Further, implementations of the present invention might occupy less space in a given system on chip (SoC) or other integrated circuit (IC) design, and possibly consume less processing power. In addition, table-based entries might easily be updated for increased performance for given implementations.

Embodiments of the present invention might modify the modulation process specified in 3GPP TS 36.211 to a modified modulation algorithm using look-up tables (LUTs) for each combination of modulation schemes and layer mapping precoding schemes (providing a substantially similar result as the modulation process defined in 3GPP TS 36.211). FIG. 1 shows an exemplary method for modulating bits with layer mapping in accordance with a 3GPP standard operating in accordance with exemplary embodiments of the present invention. Modulation process 100 might be implemented with hardware, software, or combination thereof. Advantageously, mappings between portions of an input bit stream and output modulated and precoded values might be accomplished in addressing of LUTs in hardware for increased implementation speed. Additionally, modulation process 100 might be used in either uplink, downlink, or both uplink and downlink communications for systems operating in accordance with a 3GPP standard.

As an aid to understanding the present invention, Section 7.1 of 3GPP TS 36.211 specifies modulation schemes for E-UTRA communication systems operating in accordance with the standard. Exemplary modulation schemes include binary phase-shift keying (BPSK), quadrature phase-shift keying (QPSK), 16-quadrature amplitude modulation (16QAM), and 64QAM. The types of modulation schemes that are available might depend on the physical channel. For example, in a physical downlink shared shard channel (PD- SCH), possible modulation schemes are QPSK, 16QAM, and 64QAM. In each scheme a modulation mapper takes binary digits (0 or 1) as input and produces complex-valued modulation symbols (e.g., x=I+iQ, as output). In the 16QAM modulation scheme, quadruples of bits are mapped to complex-valued modulation symbols. For example, if input bits x=0001 in a 16QAM modulation scheme, 3GPP TS 36.211 defines I as equal to $1/\sqrt{10}$ and Q as equal to $3/\sqrt{10}$.

For each codeword q, a block of bits are modulated resulting in a block of complex-valued modulation symbols $d^{(q)}(0), \ldots, d^{(q)}(M_{symb}^{(q)}-1)$, where $M_{symb}^{(q)}$ represents the number of modulation symbols to transmit on a physical channel for codeword q. The complex-valued modulation symbols for each of the codewords are mapped onto one or more layers. Complex-valued modulation symbols $d^{(q)}(0), \ldots, d^{(q)}(M_{symb}^{(q)}-1)$ for codeword q are mapped onto the layers $x(i)=[x^{(0)}(i) \ldots x^{(v-1)}(i)^T]$, where $i=0, 1, \ldots, M_{symb}^{layer}-1$; $v$ represents the number of layers; and $M_{symb}^{layer}$ represents the number of modulation symbols per layer.

Precoding takes as input a block of vectors from the layer mapping and generates a block of precoded vectors to be mapped onto resources on each of the antenna ports. For example, a downlink precoder takes as input a block of vectors $x(i)=[x^{(0)}(i) \ldots x^{(v-1)}(i)^T]$ (where $i=0, 1, \ldots, M_{symb}^{layer}-1$) and generates a block of vectors $y(i)=[\ldots y^{(p)}(i) \ldots ^T]$ to be mapped onto resources on each of the antenna ports, where $i=0, 1, \ldots, M_{symb}^{ap}-1$; $y^{(p)}(i)$ represents the signal for antenna port p; and $M_{symb}^{ap}$ represents the number of modulation symbols to transmit per antenna port for a physical channel.

Referring to FIG. 1, at step 101, an input bit sequence is received. At step 102, a modulation scheme for the received input bit-stream portion is determined from auxiliary information. At step 103, a precoding scheme for layer-mapping of the received input bit-stream portion is determined from auxiliary information. At step 104, a LUT is selected, based on the modulation scheme and layer mapping precoding scheme. Steps 102, 103 and 104 may occur before stage 101 and are relevant to one stream. Each LUT might be stored in memory, with an addressing method that is based on the possible modulation and layer mapping precoding combinations. An LUT might be created for each combination of modulation scheme and layer mapping precoding scheme, and each LUT might be stored in memory. At step 105, the input bit stream is divided into batches of N consecutive bits. At step 106, each batch is mapped by the determined LUT into K precoded layers. This provides an advantage over previous implementations because the outcome of the single LUT is the result of both the modulation and layer mapping and precoding processes, reducing processing time required to write symbol streams, read symbol streams, and map bits into symbols. Finally, at step 107, the K precoded layers for each batch are provided to the corresponding transmitter branch or antenna module to provide the information to the wireless medium.

FIG. 2 shows a block diagram of an exemplary modulation and precoding system that might implement the method of FIG. 1. For example, modulator 200 comprises parser 201, control logic 202, and transmission module 205. An input bit stream might be received by parser 201, where it is divided into batches. Control logic 202 might receive the batches and determine their modulation scheme and precoding scheme. Based on the schemes of the batches, control logic 202 might select an LUT from LUTs group 204 stored in memory 203. LUTs group 204 might have an LUT for each combination of a modulation scheme and precoding scheme corresponding to a particular physical channel. After the chosen LUT maps the batches into modulated and precoded layers, the layers might be transferred to transmission module 205. Transmission module 205 might provide the layers to a wireless communication medium, such as an antenna port or corresponding transmitter branch.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software may also be implemented as processes of circuits. Such circuits may be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of modulating an input bit stream in a wireless communication system, comprising:
    dividing the input bit stream into one or more batches each having a number of consecutive bits;
    determining, through an auxiliary channel, a modulation scheme for the one or more batches of the input bit stream;
    determining, through the auxiliary channel, a precoding scheme for layer mapping the one or more batches of the input bit stream;
    selecting a look-up table (LUT) in memory based on the modulation scheme and the precoding scheme;
    mapping, by the selected LUT, the one or more batches into a plurality of modulated and precoded layers; and
    providing the modulated and precoded layers to a transmission module.

2. The method of claim 1, further comprising:
    determining two or more combinations of modulation schemes and precoding schemes, the combinations based on a chosen physical channel; and
    creating two or more LUTs, each LUT corresponding to one of the combinations.

3. The method of claim 1, wherein the method is implemented as steps executed by a wireless handset device operating in accordance with a 3rd Generation Partnership Project (3GPP) standard.

4. The method of claim 1, wherein the method is implemented as steps executed by a wireless handset device operating in accordance with a 3rd Generation Partnership Project (3GPP) standard.

5. The method of claim 1, wherein the method is implemented as steps executed by a base station operating in accordance with a 3rd Generation Partnership Project (3GPP) standard.

6. The method of claim 1, wherein the method is implemented by a processor in a system-on-chip (SoC).

7. The method of claim 1, wherein the wireless communication system is an Evolved Universal Terrestrial Access (E-UTRA) system.

8. A communication device operable in an Evolved Universal Terrestrial Access (E-UTRA) system, the device comprising:
    a parser configured to divide an input bit stream into one or more batches each having a number of consecutive bits;
    a look-up table (LUT) configured to map the one or more batches into a plurality of modulated and precoded layers; and
    control logic, coupled to two or more LUTs, configured to (i) determine a modulation scheme for the one or more batches of the input bit stream; (ii) determine a precoding scheme for layer mapping the one or more batches of the input bit stream; and (iii) select the look-up table (LUT) based on the modulation scheme and the precoding scheme.

9. The communication device of claim 8, wherein the control logic is further configured to:
    determine two or more combinations of modulation schemes and precoding schemes, the combinations based on a chosen physical channel;
    create two or more LUTs, each LUT corresponding to one of the combinations; and
    store the two or more LUTs in a memory coupled to the control logic.

10. The communication device of claim 8, wherein the communication device is a wireless handset operable according to a 3rd Generation Partnership Project (3GPP) standard.

11. The communication device of claim 8, wherein the communication device is a base station operable according to a 3rd Generation Partnership Project (3GPP) standard.

12. The communication device of claim 8, further comprising a transmission module configured to send the modulated and precoded layers across a wireless transmission medium.

13. A non-transitory machine-readable storage medium, having encoded thereon program code, wherein, when the program code is executed by a machine, the machine implements a method for modulating an input bit stream in a wireless communication system, the method comprising the steps of:
    dividing the input bit stream into one or more batches each having a number of consecutive bits;
    determining a modulation scheme for the one or more batches of the input bit stream;
    determining a precoding scheme for layer mapping the one or more batches of the input bit stream;
    selecting a look-up table (LUT) based on the modulation scheme and the precoding scheme;
    mapping, by the selected LUT, the one or more batches into a plurality of modulated and precoded layers; and
    providing the modulated and precoded layers to a transmission module.

14. The non-transitory machine-readable storage medium of claim 13, further comprising:
    determining two or more combinations of modulation schemes and precoding schemes, the combinations based on a chosen physical channel; and
    creating two or more LUTs, each LUT corresponding to one of the combinations.

15. The non-transitory machine-readable storage medium of claim 13, wherein the method is implemented as steps executed by a wireless handset device operating in accordance with a 3rd Generation Partnership Project (3GPP) standard.

16. The non-transitory machine-readable storage medium of claim 13, wherein the method is implemented as steps executed by a base station operating in accordance with a 3rd Generation Partnership Project (3GPP) standard.

17. The non-transitory machine-readable storage medium of claim 14, wherein the method is implemented as steps executed by a wireless handset device operating in accordance with a 3rd Generation Partnership Project (3GPP) standard.

* * * * *